US008388443B1

(12) United States Patent
Korey et al.

(10) Patent No.: US 8,388,443 B1
(45) Date of Patent: Mar. 5, 2013

(54) MULTI-LEAGUE SPORTS GAMING SYSTEMS

(76) Inventors: Todd Korey, Peoria, AZ (US); Gary Cruse, Scottsdale, AZ (US)

(*) Notice: Subject to any disclaimer, the term of this patent is extended or adjusted under 35 U.S.C. 154(b) by 747 days.

(21) Appl. No.: 12/406,548

(22) Filed: Mar. 18, 2009

(51) Int. Cl.
*A63F 9/24* (2006.01)
(52) U.S. Cl. ............................................ 463/31; 463/42
(58) Field of Classification Search .................. None
See application file for complete search history.

(56) References Cited

U.S. PATENT DOCUMENTS

| 6,656,042 | B2* | 12/2003 | Reiss et al. .................... 463/17 |
| 7,001,279 | B1* | 2/2006 | Barber et al. ................... 463/42 |
| 2005/0064937 | A1* | 3/2005 | Ballman ......................... 463/40 |
| 2007/0021214 | A1* | 1/2007 | Ma et al. ......................... 463/42 |
| 2007/0072679 | A1* | 3/2007 | Kerns et al. ..................... 463/42 |
| 2007/0198443 | A1* | 8/2007 | Chernev et al. ................ 705/500 |
| 2008/0287198 | A1* | 11/2008 | Callery et al. .................. 463/42 |
| 2009/0011813 | A1* | 1/2009 | Saffron ........................... 463/17 |

* cited by examiner

*Primary Examiner* — David E Graybill
(74) *Attorney, Agent, or Firm* — Andrew P. Lahser

(57) ABSTRACT

A multi-league sports gaming system assembles a group of players to select two or more sports leagues for inclusion in game play. The sports leagues have two or more teams of two or more athletes and the teams compete with each other in a series of sporting contests. Players select teams from the sports leagues. When obtaining the results of the sporting contests, the performance of the team determines the value awarded to the player. Finally, values awarded to players are compared.

35 Claims, 12 Drawing Sheets

| Series Type | Win Value | Tie Value | Loss Value |
|---|---|---|---|
| MLB Regular Season | 1 | 0 | 0 |
| MLB Playoff Season | 1 | 0 | 0 |
| NFL Regular Season | 10 | 5 | 0 |
| NFL Playoff Season | 4 | 0 | 0 |
| NBA Regular Season | 2 | 0 | 0 |
| NBA Playoff Season | 1 | 0 | 0 |
| NHL Regular Season | 2 | 0 | 0 |
| NHL Playoff Season | 1 | 0 | 0 |

FIG 9

| Series Type | Number of Games | Average Team Score | Total | Score Value |
|---|---|---|---|---|
| MLB | 162 | 5 | 810 | 9.6 |
| NFL | 16 | 20 | 378 | 20.6 |
| NBA | 82 | 95 | 7790 | 1 |
| NHL | 82 | 3 | 246 | 31.6 |

FIG 10

| Series Type | Number of Games | Average | Total | Stat Value |
|---|---|---|---|---|
| MLB Home Runs | 162 | 1 | 162 | 2.5 |
| NFL Touchdowns | 16 | 2 | 32 | 12.8 |
| NBA Three-Pointers | 82 | 5 | 410 | 1 |
| NHL Power Play Goals | 82 | 1 | 82 | 5 |

FIG 11

| Series Type | Number of Games | Average | Total | Stat Value |
|---|---|---|---|---|
| MLB Double Plays | 162 | 1 | 162 | 15.1 |
| NFL Interceptions | 16 | 1 | 16 | 153 |
| NBA Steals | 82 | 5 | 410 | 6 |
| NHL Saves | 82 | 30 | 2460 | 1 |

FIG 12

| Type | Amount | Number | Cash | Running Total |
|---|---|---|---|---|
| Collected | $110 | 30 | $3300 | $3300 |
| 1st Overall | $1100 | 1 | ($1000) | $2300 |
| 2nd Overall | $500 | 1 | ($500) | $1800 |
| 3rd Overall | $300 | 1 | ($300) | $1500 |
| Division Leader | $100 | 6 | ($600) | $900 |
| Wild Card | $200 | 3 | ($600) | $300 |
| House Cut | | | | $300 |

FIG 13

MULTI-LEAGUE SPORTS GAMING SYSTEMS

CROSS REFERENCE TO RELATED APPLICATIONS

The present application is related to prior provisional application Ser. No. 61/038,043, filed Mar. 19, 2008, the contents of which are incorporated herein by this reference and are not admitted to be prior art with respect to the present invention by the mention in this cross-reference section.

BRIEF DESCRIPTION OF THE DRAWINGS

FIG. 9 shows a chart view illustrating the values specified for win/tie/loss performances according to a further embodiment.

FIG. 10 shows a chart view illustrating the values specified for score performances according to another embodiment.

FIG. 11 shows a chart view illustrating the values specified for statistical performances according to yet another embodiment of the present invention.

FIG. 12 shows a chart view illustrating the values specified for another set of statistical performances according to further embodiment.

FIG. 13 shows a chart view illustrating payouts for wagers placed on the final comparison of values achieved by players of the game according to an embodiment.

DETAILED DESCRIPTION

The present Multi-League Sports Gaming Systems will now be discussed in detail with regard to the attached drawing figures, which were briefly described above. In the following description, numerous specific details are set forth illustrating the Applicant's best mode for practicing the Multi-League Sports Gaming Systems and enabling one of ordinary skill in the art to make and use the Multi-League Sports Gaming Systems. It will be obvious, however, to one skilled in the art that the present Multi-League Sports Gaming Systems may be practiced without many of these specific details. In other instances, well-known software systems, software methods, business methods and other method steps have not been described in particular detail in order to avoid unnecessarily obscuring this disclosure.

Figure 1:
FIG. 1 shows a diagrammatic view illustrating a scorecard in an ongoing sporting game where teams are selected prior to a sporting contest and values are awarded based on the selected team's performance during the sporting contest, according to an embodiment.

FIG. 1 shows a diagrammatic view illustrating a scorecard in an ongoing sporting game where teams are selected prior to a sporting contest and values are awarded based on the selected team's performance during the sporting contest according to an embodiment of the invention. FIG. 1 shows a portion of gaming system 100 that includes results from future sporting contests in multiple leagues. Gaming system 100 begins by selecting multiple sport leagues for inclusion in the game. (See FIG. 4). Gaming system 100 continues by specifying a value for a result in the sporting contest. (See FIGS. 9 to 13) Gaming system 100 allows assembly of a group of players. (See FIG. 2). Gaming system 100 allows the players to select teams from the sports leagues. (See FIG. 5 and FIG. 6) Gaming system 100 obtains results regarding the performance of each team during sporting contests. (See FIG. 8). Finally, gaming system 100 shows the value achieved by each player by displaying a scorecard 102 to allow comparisons between players 103, as shown.

Scorecard 102 shows a list of players 103. For each player, the gaming system 100 shows information related to the progress of game play. Players 103 may be any suitable person, automated agent, or computerized robot that can participate in the gaming system 100, for example, by making decisions about selecting sports teams, trading sports teams, or estimating future results of sporting contests. In embodiments involving electronic or computerized displays, players 103 may be displayed interactively by operation of computer controls, such as, for example, as shown with scroll bar 109, or menu, or computer mouse movement, etc. Displaying may occur by any suitable display means such as, for example, electronic display, computer monitor, portable data assistant, portable telephone screen, paper forms, etc. To select the type of display, consideration may be given to economic, technical and deployment factors, such as, for example, number and location of players, desired communications methods, distribution of the game, economics of programming, design costs, etc.

The teams selected by a player may be displayed as team icons 104, as shown. Teams may be any suitable sporting team, which usually have more than one athlete working together to achieve a favorable result in a series of sporting contests against other teams belonging to the same sporting league, such as, for example, a hockey team, a soccer team, a squash team, volleyball team, a swimming team, a track team, a basketball team, etc. Team icon 104 may represent the team graphically or literally, by icon, name or other indicator, as shown. Team icons 104 may be grouped together within a sports league category 105, for example, all football team icons may appear in a single column, with a single heading, as shown. The sports leagues may be any suitable organization of sporting teams, such as major leagues, minor leagues, amateur leagues, youth leagues, school leagues, seniors leagues, community leagues, etc.

Players 103 may have been awarded values 106 for the teams assigned to the players 103 by gaming system 100 after selection by the players and the teams having achieved results during the performance of a sporting contest, as shown. Values may be any suitable system for ranking players, such as, for example, numbers, points, scores, money, currency, symbols, etc. Values 106 may be displayed by category, such as, for example, by sports league, by type of result, by sum total, or by other statistical grouping, as shown.

Values 106 may be displayed as comparisons between players, for example, to encourage competition and fun in playing the gaming system 100. Standings category 107 shows comparisons of values between players, as shown. Comparisons may be any suitable method for comparing players directly or indirectly, such as, for example, by aggregation to total value 106, sub total, by category, statistical grouping, payout amounts, etc.

Values 106 may be further displayed as comparisons between players, for example, by total value 108, as shown. Total value 108 may aggregate all of the values 106 assigned to the players 106. For example, the player named Your Teams has a value of 82 awarded to his football team, a value of 40 awarded to his baseball team, a value of 128 awarded to his basketball team and a value of 97 awarded to his hockey team. The sum of these values is 347, as shown. Likewise, the total values of the other players may be displayed, thereby, allowing direct and indirect comparisons between the players that may indicate the relative predictive ability or the relative luck of the player in making choices in the game, as shown.

Player rank 110 displays the overall ranking between players by ordering the player by the total values 108, as shown. For example, Player rank 110 may order players from 1st place through 30th place if thirty players are playing the gaming system 100, as shown. FIG. 1 shows that Your Teams is presently ranked 1st place, because the value assigned to Your Teams is 347, which is higher than all the other players. Likewise, Player B is presently ranked 4th place, because the value assigned to Player B is 331, which is higher than 26 other players, as shown.

Points back statistic 112 displays the difference between the leading player and the current player, as shown. For example, since the player named Your Teams is the current leader, he is zero points back. Further, Player B has a value of 331 which is 16 less than Your Teams, who has a value of 347, as shown. Player statistics may be any suitable statistic, for example, statistics that are helpful, fun or intriguing to encourage game play, such as, for example, as shown by the points back statistic 112.

Division rank 114 displays the ranking of players by subgroups, such as, for example, divisions of five or six players, as shown. Division may be indicated by division indicator 111, as shown. Sub grouping may be achieved by any suitable method, such as, for example, by handicapping players based on performance in previous games, by random assignment, by draft order, or by other factors that improve the player's sense of fun, accomplishment, success, or otherwise further engaging the player in the game.

Prospective payout 116 displays the prospective amount that a player would be paid if game play ended at the current time, which, in this embodiment, may be another method of comparing players. These arrangements for comparing the standings of players may be any suitable method or means for allowing comparisons between the values awarded to a player (as a result of the performance of a team assigned to the player) and another player's awarded values.

Figure 2:
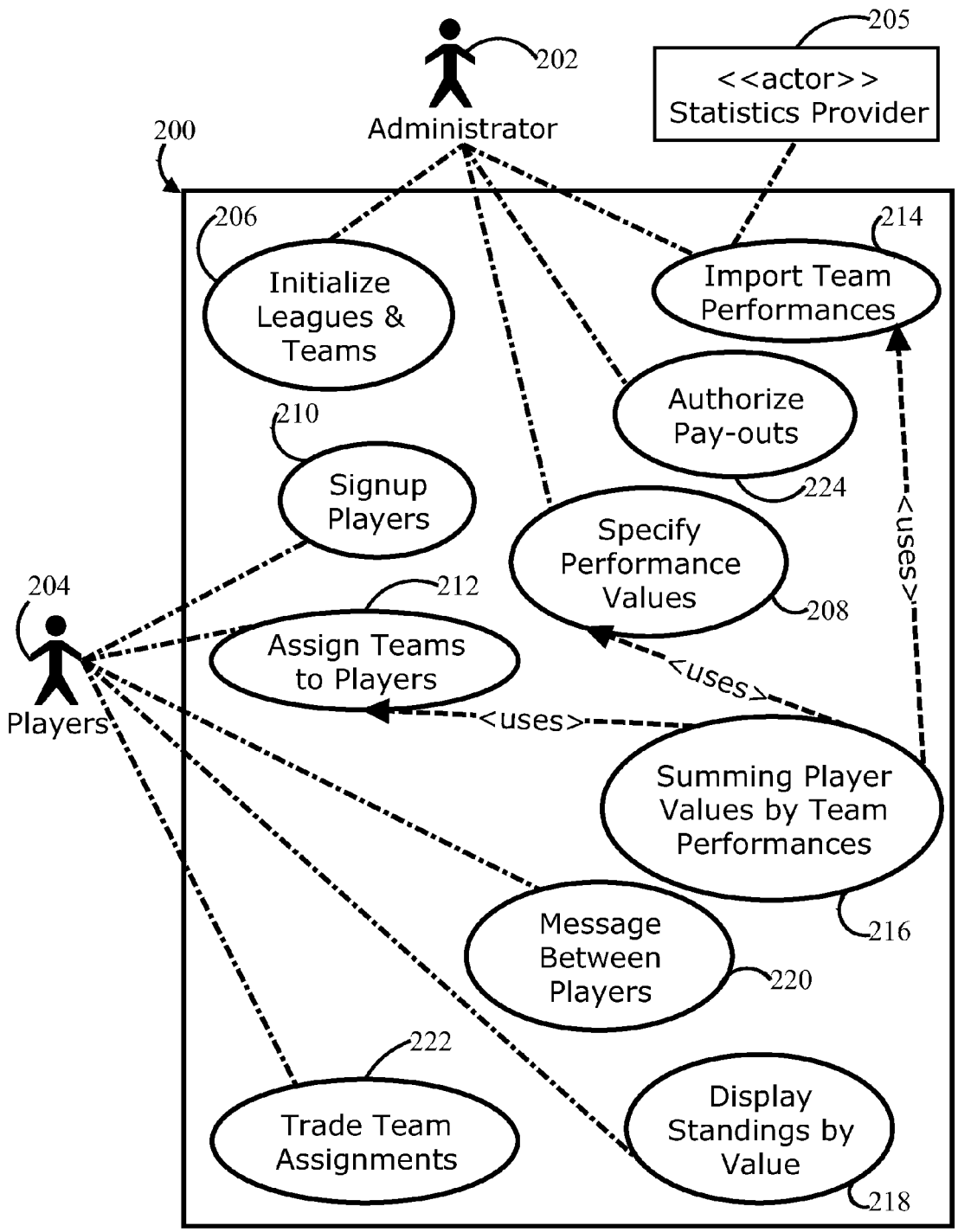
FIG. 2 shows a use case diagram illustrating functions of a system that assembles groups of players to play a fantasy sports game, assists assignment of teams to players, receives performance information for sporting contests and displays ongoing scores for players according to another embodiment.

FIG. 2 shows a use case diagram illustrating functions of a system that assembles groups of players to play a fantasy sports game, assists selection and assignment of teams to players, receives performance information for sporting contests and displays ongoing scores for players according to an embodiment of the present invention. Gaming system 200 may be any suitable manual, automated, or computerized system, such as, for example, a computer spreadsheet, statistical form, a stand-alone computer system, an application or web server, or client/server computer system, etc. Selection of the type of system may include consideration of factors such as, advancements in technology, speed of deployment, number of players, economic considerations, size of the game, the type of results and values that require tabulation, system security, etc.

Gaming system 200 performs functions for the administrator 202, players 204 and accepts input from statistics provider 205 as shown. Statistics provider 205 may be an one or more external systems, as shown. Alternately, statistics provider 205 may be another actor that requires functions from the system. Statistics provider 205 may be the sports league itself or automated systems, such as, for example, Internet webservers that provide information related to the sports leagues.

Administrator 202 begins by using function maintain leagues & teams 206, as shown. Function initialize leagues & teams 206 allows inputting of league and team information. League information may include the name of the league, the league logo, the types of series (regular season and playoff season), the series of sporting contests between teams, and other information necessary or desirable to perform the functions of the gaming system 200. Team information may include the name of the team, the team logo, the sports league to which the team belongs, and other information necessary or desirable to perform the functions of the gaming system 200. Function initialize leagues & teams 206 may be used prior to the beginning of the series of sporting contests for each of the leagues. Function initialize leagues & teams 206 may need to be used during the course of play whenever a future series of sporting contests may not be defined at the start of game play. This arrangement for selecting sports leagues may be any suitable means for selecting sports leagues for inclusion in gaming system 200, where the sports leagues have teams that compete with each other in a series of sporting contests, as shown.

Administrator 202 may further the game by function specify performance values 208, as shown. Function specify performance values 208 allows inputting of a specified value which may be awarded to a player whenever a team assigned to the player achieved a certain performance during a sporting contest, such as, for example, winning the sporting contest.

Players 204 may begin by joining the game using function signup players 210, as shown. Function signup players 210 may register the player for the game, such as, for example, by accepting information related to the player, by processing a payment from the payer, by determining a player handicap, by assigning a draft order, or by gathering other data needed for later game play. Function signup player 210 may be any suitable assembling means for assembling a group of players to play the gaming system.

Players 204 continue by selecting teams using the function assign teams to players 212, as shown. Function assign teams to players 212 allows players 204 to select teams for their scorecard, which may be compared to the scorecards of other players during the game and to finally determine a winner. Function assign teams to players 212 may be used prior to the start of any series of future sporting contests which may be considered during the course of the game.

During the course of game play, gaming system 200 may require input of the results of the performances of teams during the series of sporting contests that are considered during the course of game play. Function import team performances 214 allows gaming system 200 to accept information related to the performance of each team during a sporting contest. Function import team performances 214 may occur from an external system, such as statistics provider 205, as shown. Importing team performances may occur by any suitable method or means for providing data to a system, such as, for example, by a structured extensible mark up language document (XML) transmitted over a global computer network, deriving values from electronic news sources, a computer screen designed for data entry, a statistical paper form, a computer spreadsheet, etc.

Gaming system 200, after performing function import team performances 214, may award value to players and recalculate any comparisons by performing function summing player values by team performances 216, as shown. Function summing player values by team performances 216 uses data from at least three other functions, including, function specify performance values 208, function assign teams to players 212, and function import team performances 214, as shown. (See also FIGS. 8 to 12)

Players 204 may be desire to see the current value awarded to them by gaming system 200 and may use function display standing by value 218, as shown. Function display standing by value 218 may organize the information for the player and format the information for display to the player, as shown. (See also FIG. 1)

Players 204 may further desire to communicate with other players regarding the progress of the game, the current performances of the sporting teams, or otherwise further relationships between players, and they may do so using function message between players 220, as shown. (See also FIG. 7.) Players 204 may desire to trade teams during the course of game play. Players 204 may trade teams using function trade team assignments 222, as shown. (See also FIG. 7) Team trading may occur by any suitable method or means of negotiating a trade, for example, an online messaging system, an auction, trading teams with or without value, etc.

Administrator 202 may further desire to declare one or more winners. Administrator 202 may award the winners with a payout. A payout may be any suitable transfer of wealth, such as, for example, a cash prize, a merchandise prize, a vacation, etc. Administrator 202 may pay players 204 using function authorize pay-outs 224, as shown. (See also FIG. 13)

In some embodiments, administrator 202 may be a computer system or other automated agent or computer robot. In other embodiments, some functions may not be needed, for example, when a gaming system may be configured to only play with pre-determined leagues or teams, then functions related to maintaining that data may not be necessary. In other embodiments, team trading may not be allowed or communications between players occur outside of the system, etc. Also, a further embodiment may have all of these functions implemented on a single computer with a display and database for operating the gaming system, such as, for example, a CDROM or virtual appliance package configured for installation on a computer system.

Figure 3:
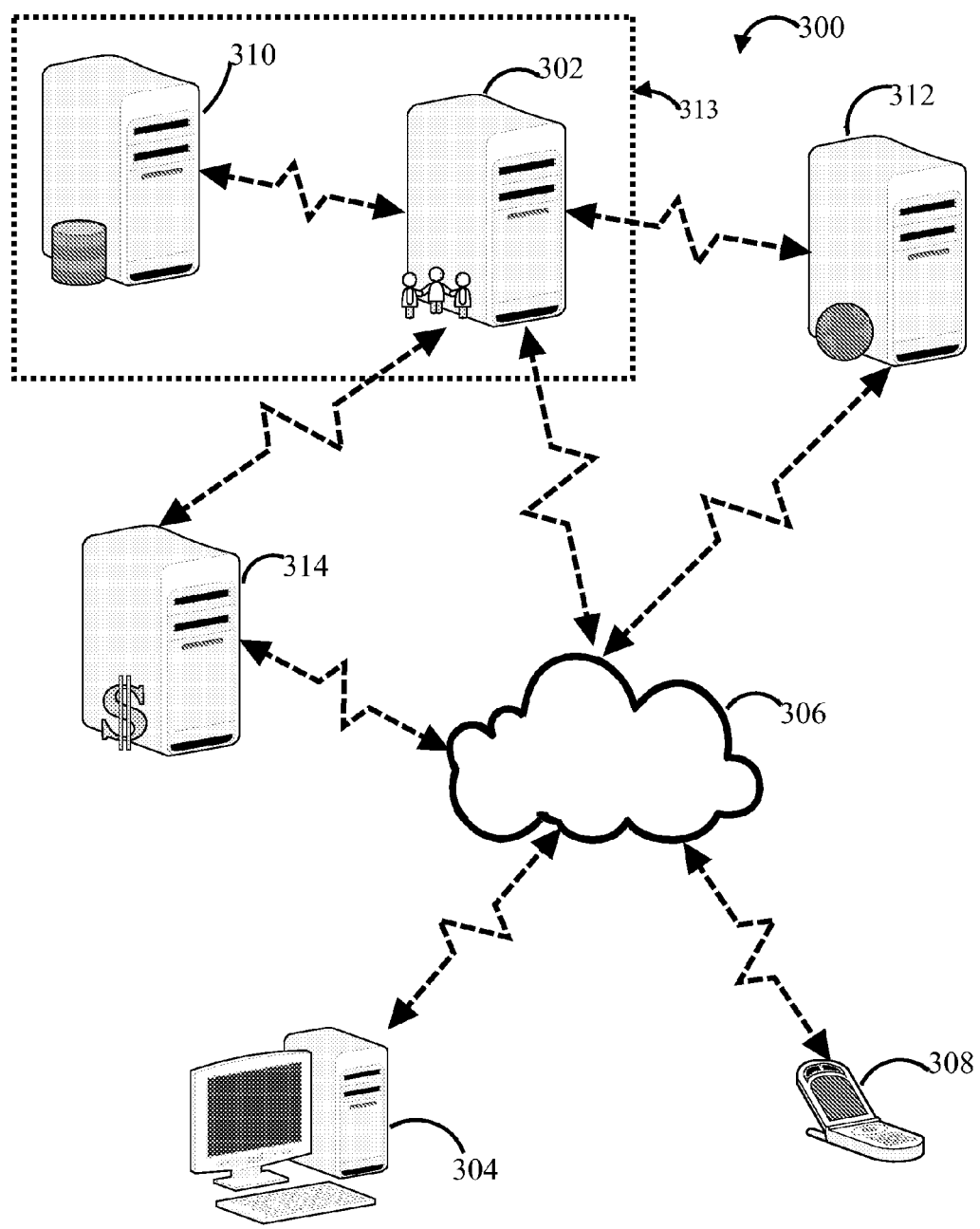
FIG. 3 shows a network architecture diagram illustrating an Internet enabled computer system configured to perform the functions of a sporting game according to a further embodiment.

FIG. 3 shows a network architecture diagram illustrating an Internet enabled computer system 300 configured to perform the functions of a sporting game according to an embodiment of the present invention. Computer system 300 may have a variety of different servers, server programs or functions. This embodiment shows various functions being performed by various dedicated servers, which may be configured to communicate over a private network or a globally connected network, such as the Internet. Computer system 300 is shown with application server 302, which may be any suitable computer system capable of communicating over a globally connected computer network and communicating with other servers, such as, for example, a computer programmed to execute the rules of the game and display the output (scorecards, team assignments, etc.) to the players across the Internet. Player computer 304 may communicate with application server 302 across the Internet 306, as shown. Player computer 304 may be any suitable device for sending input to a server and rendering output from that sever across a network, such as, for example, a computer configured with a web-browser that can transmit an HTTP request to a web-server configure to receive that HTTP request and appropriately respond with an HTML document that may be displayed on player computer 304. Internet 306 may be substitute by any suitable global or wide-area communications network, such as, for example, a wireless telephony network or computer network.

Application server 302 may be configured to perform functions such as assembling groups of players (see also FIG. 2, function signup-players 210), accepting team information and league information (see also FIG. 2, function initialize-leagues-and-teams 206 and function import-team-performances 214), allowing importing of the performance of teams that are measured during the sporting contests (see also FIG. 2, function import-team-performances 214), specifying values to award to players as a result of the performance by the teams (See FIG. 2, function specify performance values 208), and displaying comparisons between the values awarded to players (see also FIG. 2, function display-standings-by-value 218). Alternately, different functions may be performed by different computers depending on factors, such as, for example, application design preferences, network traffic and security, game popularity, game rule variations, economic factors, advances in technology, etc.

Alternately, other types of devices, such as, for example, portable data devices 308 may communicate with application server 302, as shown. Portable data devices 308 may be any device suitable for mobile and personal use that allows sending and receiving of information needed to play the game, such as, for example, a cellular phone configured with short message service (SMS), or a personal data assistant (PDA) configured with data access and a mobile web browser, etc. Player computer 304 and portable data device 308 may have a screen or display for displaying the progress of the game to the player, as shown.

Alternately, other types of protocols may be used to send information between either player computer 302, or portable data device 308, and any of the servers, such as application server 302; some example protocols may be structured documents, such as, for example, extensible markup language (XML), really simple syndication (RSS), an RFC compliant email message, instant messages, text messages, etc. Other protocols may use similar methods to display the progress of the game to the player on either player computer 302 or portable data device 308.

Application server 302 may be connected with database server 310, as shown. Database server 302 may be any suitable means or method for persistently storing data and information electronically in computer systems, such as, for example, using an operating system file system, using a flat-file database, using a relational database, using an object-oriented database, etc. Database server 302 may be connected directly to application server 302, as shown. Alternately, database server 302 may be connected through a local area network, virtual network, or other communications method. Database server 302 may not need to be directly connected with Internet 306, as shown.

Database server 302 may be configured to perform functions such as storing assignment information (see also FIG. 2, function assign-players-to-teams 212, FIG. 6, and see also FIG. 14 generally), and other information needed to perform the functions of the gaming system 300. Alternately, storage functions may be performed by different computers depending on factors, such as, for example, application design preferences, network traffic and security, game popularity, game rule variations, economic factors, advances in technology, etc.

Application server 302 may alternately be a middleware program that communicates with communications server 312, as shown. Communications server 312 may be any suitable computer program for sending and receiving HTTP requests and HTML documents, such as, for example, commercially available web server programs like Microsoft IIS Server and Apache webserver. Alternately, communications server 312 may be a load balancing proxy server. Communications server 312 may receive requests from player computer 304, interpret those requests. Communications server 312 may then respond to those requests either by direct response when the information may be stored or cached locally; Communications server 312 may alternatively respond by forwarding a portion of the request or formulating a further request (for the portion of the data not presently available within communications server 312) for application server 302, as shown. Communications server 312 may help with balancing request loads to increase performance, adding redundancy to ensure uptime, increasing security of more vulnerable systems, etc.

In another alternate embodiment, application server 302 may be insulated from insecure or public networks by firewall 313, as shown. In such configurations, web server 312 may communicate directly to application server 302 through firewall 313, or through a more direct or secure connection, like a local area network or a dedicated circuit, as shown. Firewall 313 may be any suitable means or method for preventing or restricting communications with an insecure or public network, such as, for example, a hardware firewall router, a network architecture that allows communication over private lines, a virtual private networking arrangement, etc. In such a configuration, player computer 304 may not communicate directly with application server 302, as shown.

Application server 302 may alternatively connect with secure-payment server 314 that allows processing of payments over insecure or public networks, such as the Internet. Secure-payment server 314 may be any suitable means or method for allowing players to make payments using player computer 304, portable data devices 308, or using any other method or device for playing the game across a public or insecure network. Secure-payment server 314 may be any suitable means or method of allowing monetary transactions between the player (using a device) and the game (using application server 302), as shown. Secure-payment server 314 may use encryption or other methods for maintaining confidential details of any monetary transaction.

In an alternate embodiment, communications server 312 may be an independent system that provides social network services to the public. In this embodiment, communications server 312 may be any suitable website that provides a variety of social networking features to the public or a target community (such as a group of sports fans) and also has an advanced programming interface to allow third-parties to provide additional features, such as, for example, facebook-.com. In this embodiment, the website may provided a method for using or presenting the functions of application server 302, such as, for example, by an advanced programming interface (API), by an hypertext markup tagging (frame, objects, etc.), by an extensible markup language remote procedure calls (XML-RPC), or other suitable methods. The social networking website may further provide a portion of the functionality, such as, for example, messaging and communications between players (See FIG. 7)

In other embodiments, servers may be replaced by databases, software programs, or program functions, or by combinations thereof that may be running on a single computer, or, alternatively, in a distributed computing environment having many computers. This software architecture configuration may depend on factors, such as, for example, advances in programming techniques, economic considerations, design preference, game rule variations, wagering rules and amounts, game popularity, network security issues, network performance, deployment and packaging considerations, etc.

Figure 4:
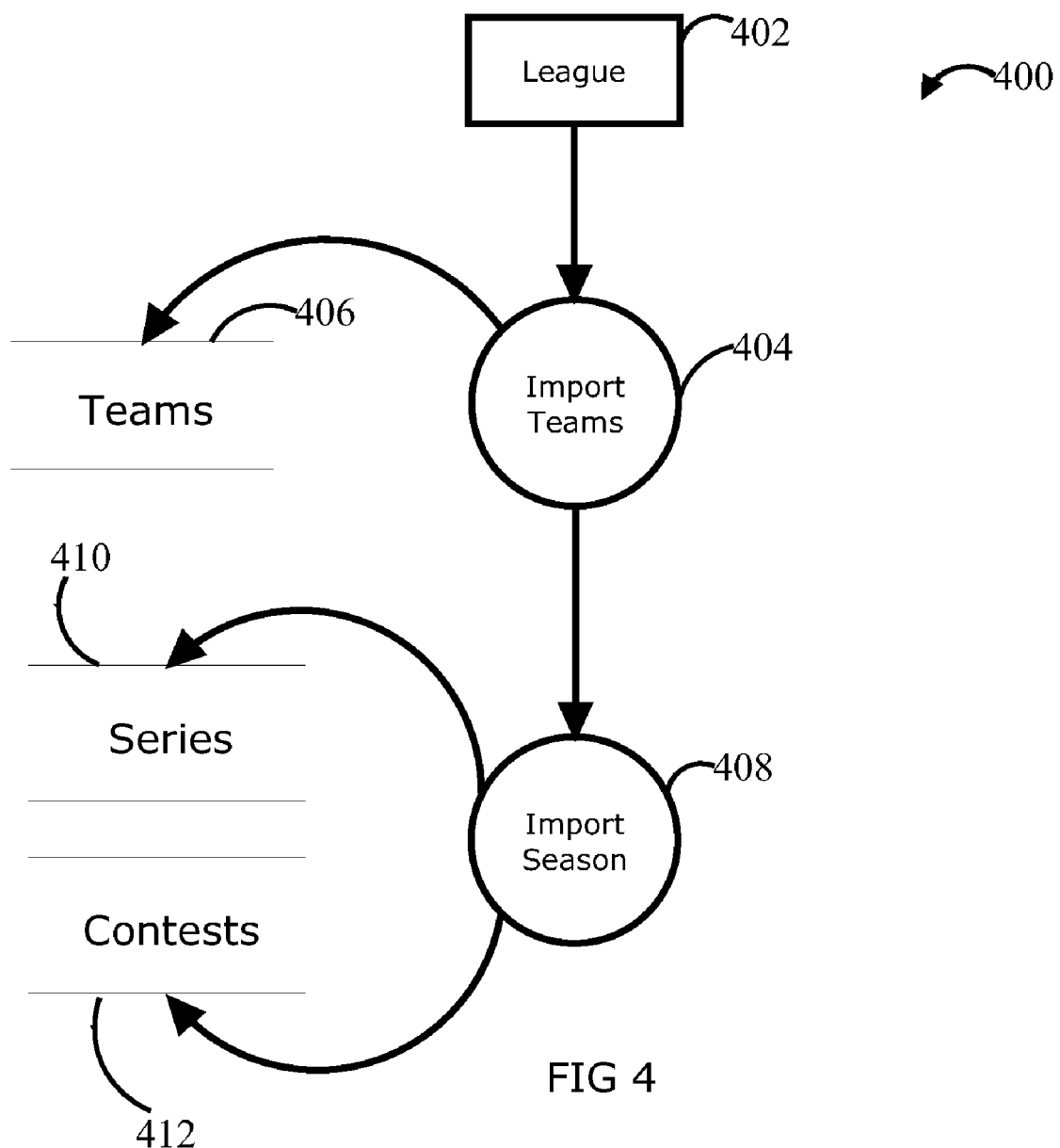
FIG. 4 shows a data flow diagram illustrating a series of steps to input the sports leagues, the teams, and the series schedule information according to yet another embodiment.

FIG. 4 shows a data flow diagram illustrating a series of steps to input the sports leagues, the teams, and the series schedule information according to an embodiment. Gaming system 400 has process import-teams 404 that receives team information from external entity league 402 and stores that information in database team 406, as shown. Process import-teams 404 may be any suitable means or process for allowing inputting of information or data into gaming system 400, such as, for example, a computer function, a computer program, an interface, an advanced programming interface (API), a file or data import routine, a management screen for inputting data via a computer keyboard and mouse, forms, etc. Process import-teams 404 may accept information such as the names of the teams, the number of teams, the geographic location of the teams, the web-link to the team's website, etc. (see also FIG. 2, function initialize-leagues-and-teams 206.)

External-entity league 402 may be any suitable external entity that has information related to the league, the teams, or the series of sporting contests which are played during a series, such as, for example, a sport statistician, a website that publishes those statistics electronically, or other publication services. The leagues include teams of athletes. In an alternate embodiment, the leagues may be the National Football League (NFL), Major League Baseball (MLB), the National Basketball League (NBA), and the National Hockey League (NHL), each of these leagues has about thirty teams and the game may be played with about thirty players. When the number of players is substantially equivalent to the number of teams, then this arrangement may allow selection of substantially all of the teams within each league if the game rules require selection of one team from each league. Alternately, a minor league baseball, basketball, football and hockey league could be used. As a further alternative, differing types of sports (such as, for example, soccer, volleyball, rugby, softball, field hockey, etc) or differing types of leagues (such as, for example, minor leagues, amateur leagues, adult leagues, and youth leagues) may be combined to produce games that are interesting or fun for the players.

Team database 406 may be any suitable means or method for persistently storing information, such as, for example, a relational computer database table, a computer spreadsheet, scoreboards, etc. (See also FIG. 14.)

Process import-season 408 may be any suitable means or process for allowing inputting of information into gaming system 400, such as, for example, a computer function, a computer program, an interface, an advanced programming interface (API), a file or data import routine, a management screen for inputting data via a computer keyboard and mouse, forms, etc. Process import-season 408 may accept information such as the date of a matchup (sporting contest) between a home team and a visiting team, how many sporting contests may be played by each team, the type of season (e.g. regular season, playoff season, or other type of season), the year of the season, the relative value for achieving a particular result during sporting contest during the series, or other information that may assist in the playing the gaming system 400. In an alternate embodiment, the game may include one regular season and one playoff season for each league. In a further embodiment, the game may include combinations or series of sporting contests from multiple seasons. Or, the game may include combinations of series of sporting contests that are less than all of sporting contests in a season (e.g. a sub-season).

Series database 410 may be any suitable means or method for persistently storing information, such as, for example, a relational computer database table, a computer spreadsheet, forms, scoreboards, etc. Contests database 412 may be any suitable means or method for persistently storing information, such as, for example, a relational computer database table, a computer spreadsheet, forms, scoreboards, etc. (See also FIG. 14.)

Figure 5:
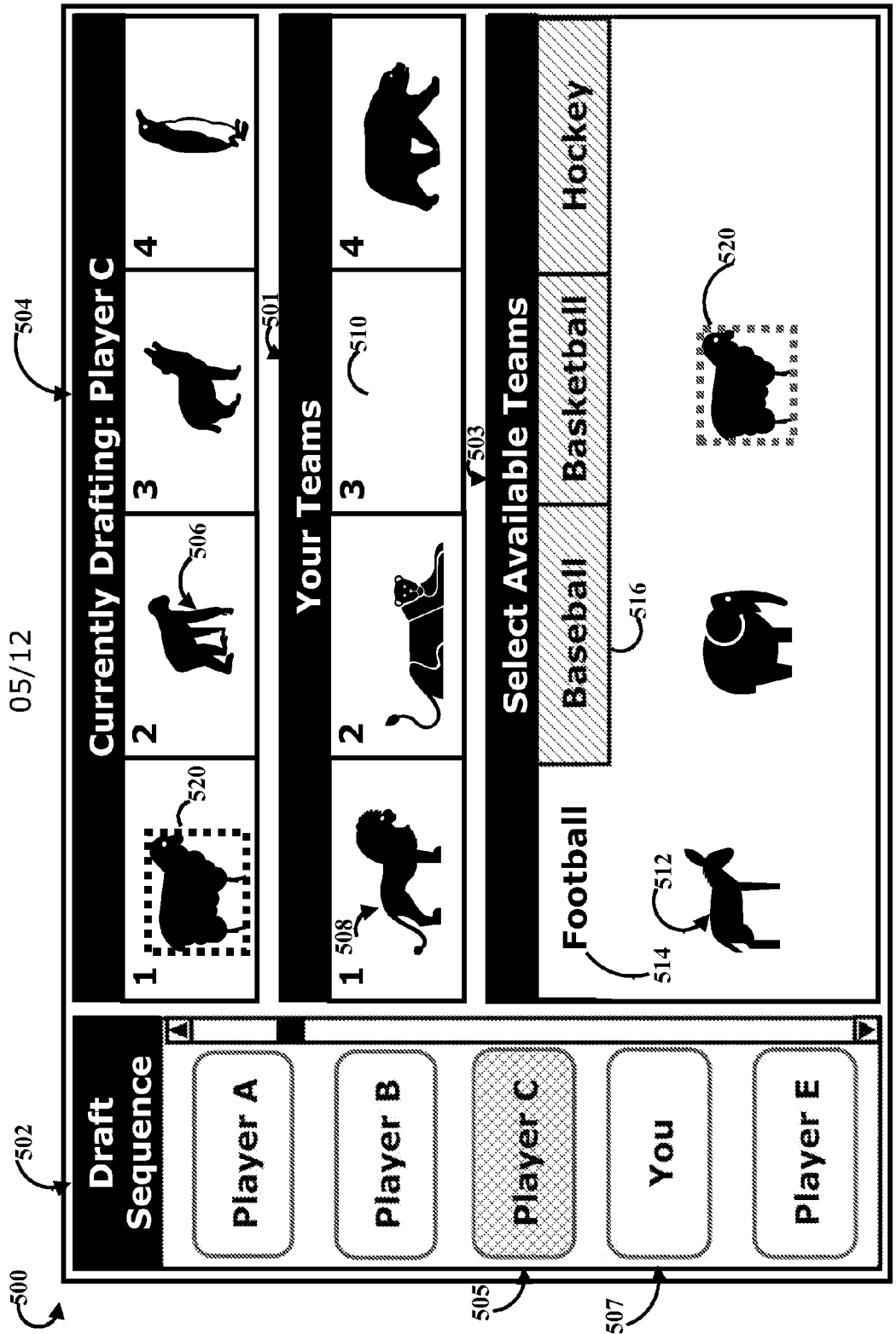
FIG. 5 shows a diagrammatic view illustrating a computer screen that allows inputting of team selections and team trades by a player according to the embodiment of FIG. 1.

FIG. 5 shows a diagrammatic view illustrating computer screen 500 that allows inputting of team selections and team trades by a player according to another embodiment. Computer screen 500 is divided into four sections for visual processing; the present player section 501, the draft sequence section 502, the available teams section 503, and the active player section 504, as shown. Other arrangements may be suitable or desirable, depending on factors such as human interface design principles, game rules, economic considerations, software deployment/packaging considerations, etc.

Draft sequence section 502 shows the order that players may select teams, in a round robin fashion, including, for example, online and in real time. So, for example, in one embodiment, player A will select one team from any league; next, player B will select one team from any league so long as the team was not selected by player A; next, player C 505 will select one team from any league so long as the team was not previously selected; followed by a selection by present player 507, etc., as shown. Draft order may be determined by previous performance in previous games; for example, to handicap players that have performed better in the past, or to reward player for strong play in the past. Alternately, draft order may be determined randomly. The method of selecting the draft order may be disclosed as a rule of the game and may be a factor for creating interest or fun among players.

Present player 507 is shown as having already made three team selections, which are shown as icons such present player team selections 508, which is viewable in present player section 501, as shown. Present player team selections 508 may be any suitable icon to indicate selection, such as, for example, dropdown lists of team names, scrolling areas of team logos, mind maps of team mascots, the outline of the team state overlaying the outline of the country (or other relevant geopolitical divisions), or other identifier. Present player 507 may expect to make one further selection (for a basketball team in the third column) into team selection area 510, which is shown as empty.

Available team section 514 shows the teams that have not been previously selected. Unselected teams 514 may be any suitable icon to indicate availability for selection by a player, such as, for example, dropdown lists of team names, scrolling areas of team logos, mind maps of team mascots, the outline of the team state overlaying the outline of the country (or other relevant geopolitical divisions), or other identifier. Unselected teams 514 may be organized into categories, such as, for example, by league using a tabbed-browsing metaphor. For example, in this embodiment, the player can click on the football tab 514 to see the portion of unselected teams 514 within the football league, as shown; likewise, if player were to click baseball tab 516, the displayed icons would change to show unselected baseball teams. In this embodiment, once a team has been selected by a single player, that team is no longer available for selection by any other player; e.g. one team may be exclusively assigned to one player. Further, in this embodiment, each player may only select one team from each league included in the game. This may be shown by aligning the icons into columns above the tab belonging to each sport, as shown, or by any other method. Similarly, if other rules of selection are included within the game, they may be represented visually in the team selection process.

Computer screen 505 further shows that present player 507 is viewing Player C 505 who is actively selecting a team (e.g. Player C is selecting his football team in the first column). The shading of Player C (indicated by a cross hatch pattern) shows that this Player is active. Correspondingly, the title of active player section 504 shows the name of Player C 505, (which is "Player C"), as shown. Active player section 504 also shows the active player team selections 506, which are icons of teams selected by Player C 505, as shown. Player C 505 has selected football team 520, which is indicated on computer screen 505 as a sheep icon surrounded by a selection box. Selected football team 520 appears twice on computer screen 505; first, it appears in the available teams section 503; second, it appears in the football column of the active player section 504, as shown. In this way, the present player 507 and other players, may watch or participate in the selection and assignment of teams, such as, for example, in a real-time, virtual, online meeting format. This arrangement (and other arrangements described herein) for assigning may be any suitable means for assigning a team to a player, as shown.

Additionally, player messaging, social networking features (see FIG. 7), season and series sport contest listing services, and other functions described in other embodiments or elsewhere in this disclosure may be incorporated into this team selection screen or related functions as required by the design of the gaming system when considering factors, such as, for example, rules of the game, software packaging/deployment considerations, software architecture, economic considerations, etc.

Alternately, in embodiments where the number of teams in each sport sports leagues is approximately equal, the number of players may be less than the number of teams in each league. For example, major sports leagues (like the NBA, NHL, NFL and MLBA) all have about 30 teams. By playing a game with 30 players, this provides for fun and interesting among the players, as each teams performance will contribute to the result of the game. If less than 30 players are available, a game may be played with less. In this situation, the rules of the game may predetermine subsets of teams available from each league. That is, if there are 8 players, then the teams may be divided into groups of 8, for example, the first 8 highest-ranked teams, the second 8 highest-ranked teams, etc., within each league. Players may then select one team from each subset within each league. The ranking of the teams may be done by any method, such as, for example, by the prior season's performance, by analyst rankings, random, etc.

Figure 6:
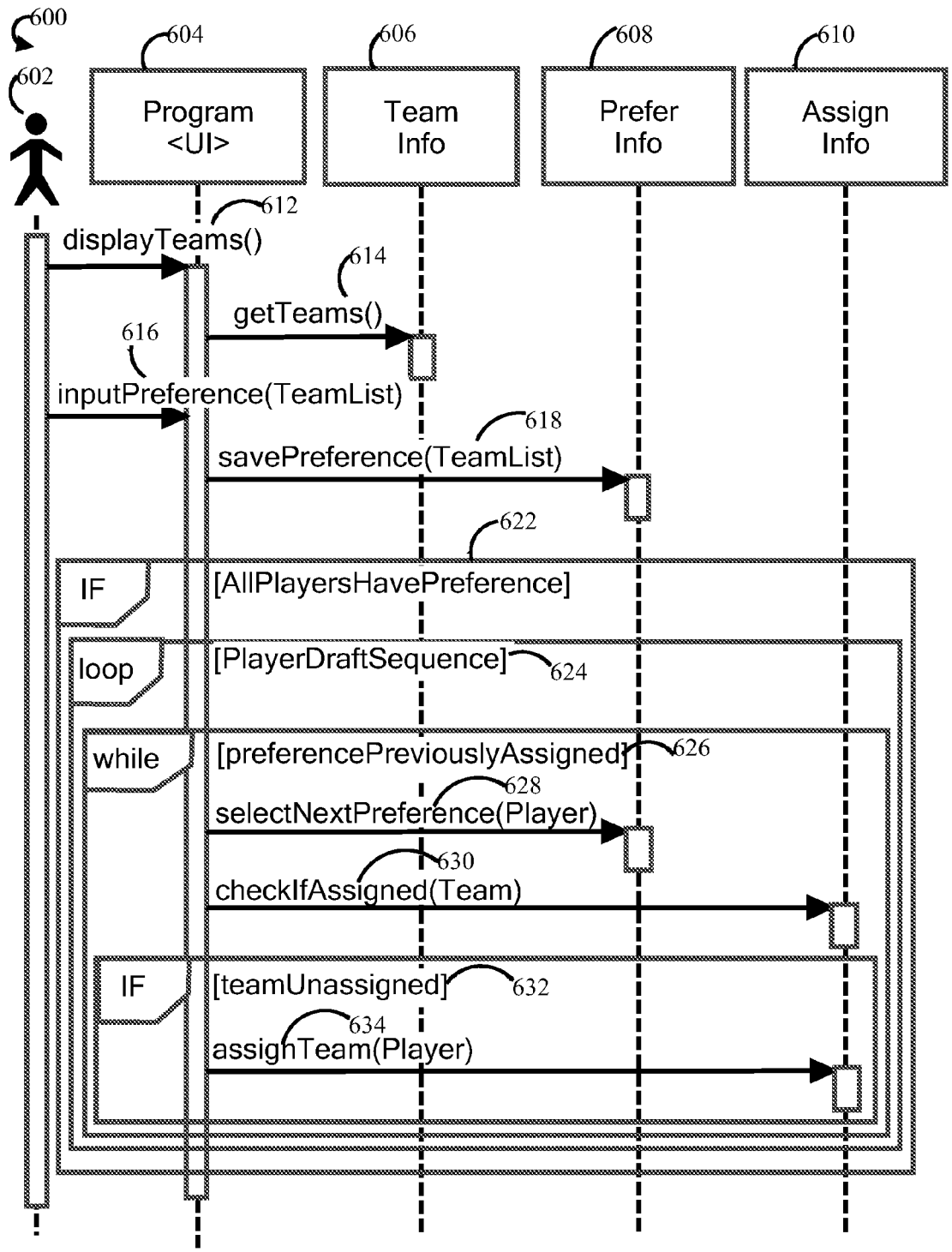
FIG. 6 shows a sequence diagram illustrating a series of actions to assist the assembly of players and the assignment of teams according to another embodiment.

FIG. 6 shows a sequence diagram illustrating a series of actions to assist the assembly of players and the assignment of teams according to an embodiment of the present invention. Such a series of actions may be used to detail the development of a software function that performs team to player assignments. In the shown series of actions, the players may make selections without other players being present, such as, for example, by listing the preferences of all of the teams, by bidding (auction-style) on all of the teams, or by any other method that allows collection of the preferences of the players or listing of a player's desired teams even when all players are not available at the same time.

Action sequence 600 shows the programmatic relationships between player 602, program 604, team database 606, preference database 608, and assignment database 610. Action sequence 600 begins when player 602 initiates procedure displayTeams 612, which invokes program 605 and eventually results in a display of teams to the player, such as, for example, when a player uses a web browser to access a website that is configured to play the game by displaying the teams for selecting and preferring.

Action sequence 600 continues when program 605 invokes procedure getTeams 614, which accesses team database 606, for example, by formatting a SQL query to access a relational database table that will return a list of teams and other information that may assist player 602 to select or prefer teams that player 602 desires to be assigned to player 602, as shown. As a result, player 602 may view the team information needed to make a list or other preference of teams.

Procedure inputPreferences 616 allows player 602 to input the list of teams or other type of team preferences and transmits that information to program 604, as shown. Program 604 may store that information by invoking procedure savePreference 618, which may be any suitable procedure for placing such information in persistent data storage, for example, by formatting a SQL command that stores the team list into a relational database table.

Action sequence 600 may continue (either periodically, after any invocation of procedure savePreference 618, or at another programmatically correct time) by program 604 checking condition AllPlayersHavePreference 622, which allows program 604 to check whether all players assigned to the game have stored a preference in team database 606, as shown. When all players have indicated (and stored, as necessary) a preference, program 604 may continue with loop PlayerDraftSequence 624, which will initiate a batch method of assigning players to teams without interactivity of the players. Loop PlayerDraftSequence 624 may begin by establishing an order for processing the players, similar to the draft order established in FIG. 5, above. In alternate embodiments, especially when the selection of a team is not exclusive to a player, the order of processing players may be arbitrary, because multiple players may select the same teams. In embodiments that allow non-exclusive assignment of teams, the choices of the players may be hidden from other player until after all player selections have been made; this may prevent players from "copying" the selections of the other players. In other embodiments, the order of processing players may be derived from the preferences or listings of the players, such as, for example, when player may bid or auction on teams; under such circumstances, highest bids may select before lower bids.

During loop PlayerDraftSequence 624, program 604 may begin by invoking the procedure selectNextPreference 628, which may use the current player (in the draft order, or order of player processing) to retrieve the players next preference information from the preference database 608, as shown. Procedure selectNextPreference may track which preference is being processed (first team choice, second team choice), by using a memory array, linked list, or other programming method, or such tracking may be inherent in the structure or content of the data stored in preference database 608, or may be achieved by other programming method.

Program 604 may continue by invoking procedure checkIfAssigned 630, which may use the preferred team of the current player to check the assignment database 610 to determine whether a previous player has selected the preferred team. If the preferred team has been selected, procedure selectNextPreference 628 and procedure checkIfAssigned 630 may be invoked repeatedly until an unassigned team is found. In other embodiments, this logical process may be replaced by other programming flows or methods, such as, for example a SQL query that joins the preference database and the assignment database to return the next preference that does not appear in the assignment database.

While still processing loop PlayerDraftSequence 624, program 604 may check condition teamUnassigned 632, which may indicate whenever the current team has not been previously assigned to another player. When the team is available for assignment, program 605 invokes procedure assignTeam 634, which may be any suitable procedure for placing such assignment information in persistent data storage, for example, by formatting a SQL command that stores the assignment information in the assignment database 610.

Program 604 may continue in this fashion, until all players have been assigned teams according to the rules of the game.

Figure 7:
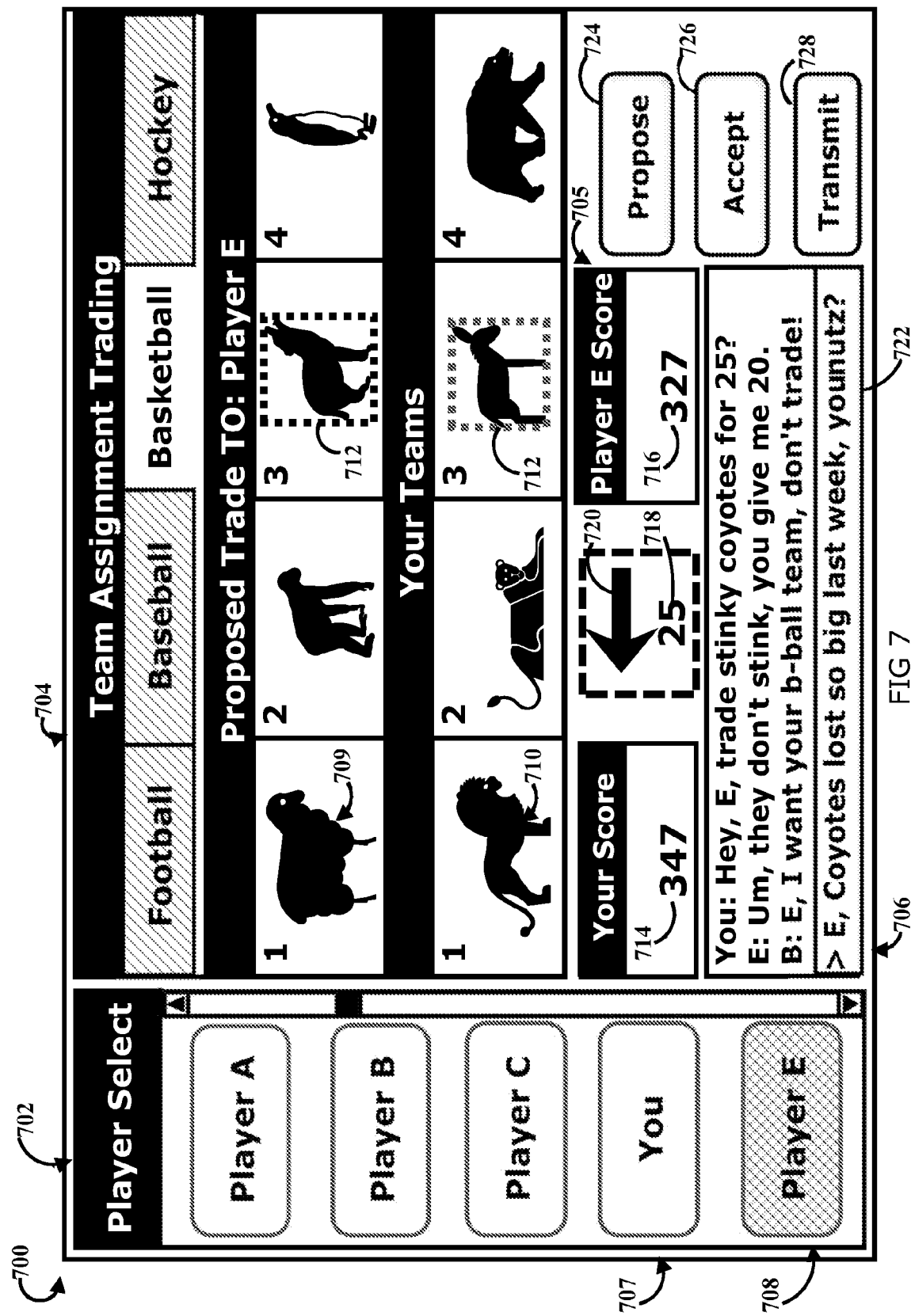
FIG. 7 shows a diagrammatic view illustrating a computer screen that allows inputting of team trades and messaging between players according to a further embodiment.

FIG. 7 shows a diagrammatic view illustrating computer screen 700 that allows inputting of team trades and messaging between players according to an embodiment of the present invention. Computer screen 700 shows four sections, player selection section 702, team assignment trading section 704, score trading section 705, and player messaging section 706. Player selection section 702 shows a scrollable list of players to facilitate selection of the player for proposing a trade; this section shows present player 707 and selected player 708, where the selected player is indicated screen highlight, such as the cross hatch pattern in the diagram. Team assignment trading section 704 shows the teams belonging to present player 707 and selected player 708 for a proposed trade. Score trading section 705 shows the relative values of present player 707 and selected player 708, as shown. Messaging section 706 shows messages transmitted between players who may be negotiating a trade between teams, as shown.

Present player 707 may begin using computer screen 700 to make a player selection in the player selection section 702, which may then show that player E is the selected player 708. After selection of selected player 708, computer screen 700 may display the selected player's teams 709 and the current player's teams 710 in team assignment trading section 704, as shown. To initiate a trade, present player 707 may click on the tab or button that is labeled with the type of league, for example, the basketball tab is selected in FIG. 7. After selecting the basketball tab, computer screen 700 may display proposed trade selection 712, which may appear as a highlighting of the teams that present player 707 wishes to trade, as shown. For example, present player 707 may wish to trade donkey basketball for coyote basketball, which belongs to Player E, who is the selected player 708, as shown. In embodiments like the shown embodiment, where each player may only be assigned to one team within each league, trading teams between leagues may not be possible. In other embodiments, players may select as many teams as desired between leagues, and cross-league trades may be allowed.

Computer screen 700 may show score trading section 705, which may further allow present player 707 to refine the terms of the trade, for example, by allowing previously awarded value (e.g. score) to be an additional, optional, term of the trade. Score trading section 705 shows present player's value 714 and selected player's value 716. To establish a value transfer as a condition of the trade, present player 707 has clicked the transfer arrow 720 until it points toward present player's score 714, as shown. Present player 107 may further type the value to be transferred in value transfer box 718, as shown. Present player 707 has typed 25 into value transfer box 718, which, together with the indication of transfer arrow 720, means that present player wishes to trade donkey basketball to player E in exchange for coyote basketball plus 25 of Player E's value. To send this proposal to selected player 708, present player 707 may click the propose button 724. To accept the proposal, selected player 708 would click a button similar to accept button 726, but such button would appear on the computer screen that was viewable to selected player 708. Upon acceptance of a trade, computer screen 700 may direct the trade to be stored in a persistent data storage (discussed elsewhere), thereby allowing trading of assignments between players, and allowing trading of value between players, and combinations of both. In some embodiments, multiple teams may be proposed in a single transaction. Other buttons may be needed or desired to reject, delay, counter-offer or assist in the performing of other types of negotiation functions.

Finally, player messaging section 706 may allow for communication between players to facilitate negotiation or allow interaction or social networking between players. For example, present player 707 may type a message in message box 722 and press transmit button 728. The typed message may be transmitted to selected player, all players, or a subset of players depending on player preference, game rules, software architecture/deployment considerations, etc.

Figure 8:
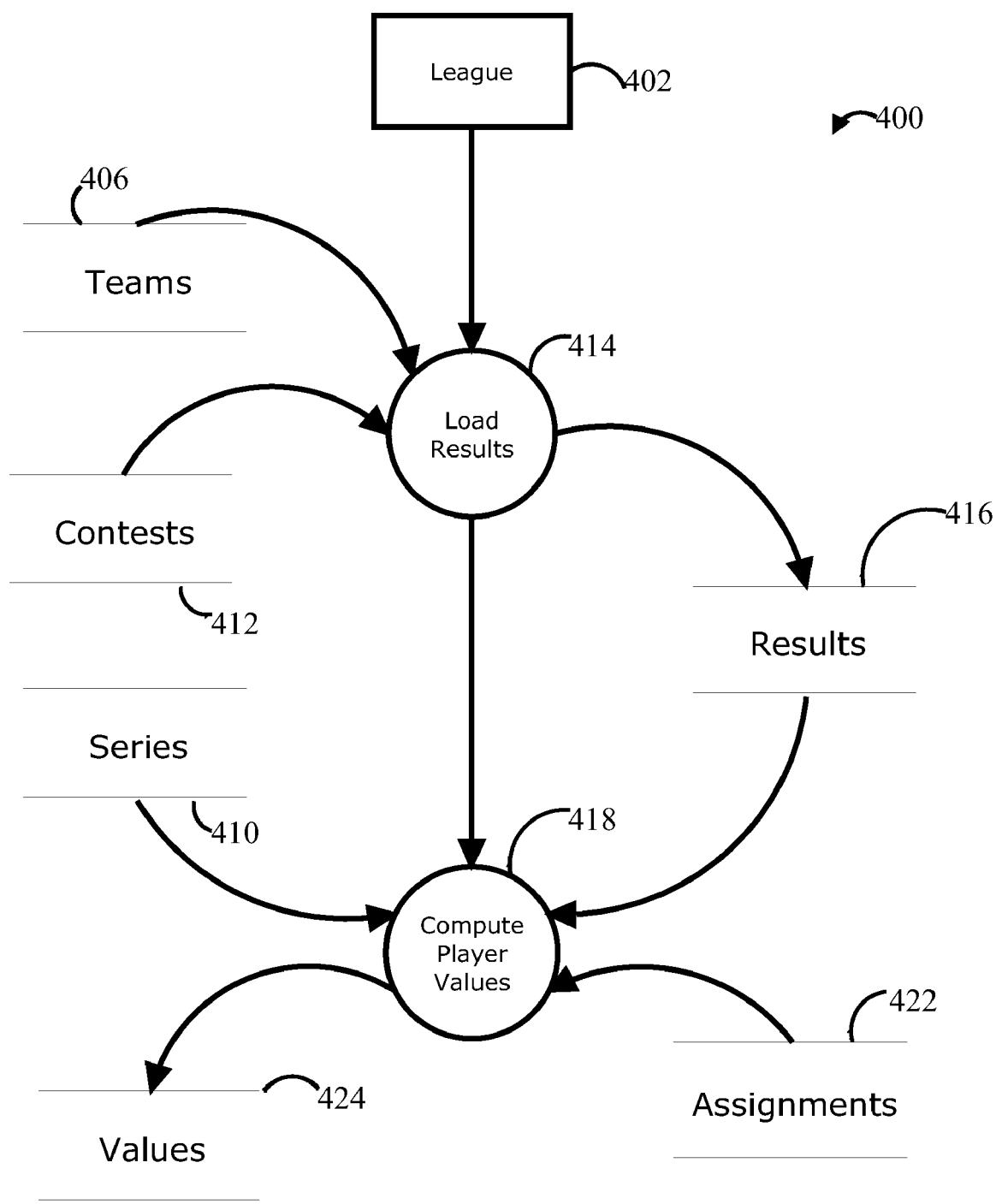
FIG. 8 shows a data flow diagram illustrating a series of steps to input the results of the performance of teams during sporting contests according to the embodiment of FIG. 4.

FIG. 8 shows a data flow diagram illustrating a series of steps to input the results of the performance of teams during sporting contests according to the embodiment of FIG. 4. Gaming system 400 has process load-results 414 that receives the results of sporting contests from external entity league 402, as shown. Process load-results 414 may obtain information related to the performance of a team during a sporting contest, such as, for example, the win/loss outcome of the sporting contest, the score of each team involved in the contest, statistics related to the performance of the team, and other results (see also FIG. 9 to FIG. 13). Process load-results 414 may then retrieve information related to the team and the sporting contest from team database 406 and contest database 416, respectively, as shown. Process load-results 414 may then verify that the results received correspond or correlate to team and contest information. Process load-results 414 may then store the results of the sporting contest in results database 416, as shown. Results database 416 may be any suitable means or method for persistently storing information, such as, for example, a relational computer database table, a computer spreadsheet, forms, scoreboards, etc.

Gaming system 400 has process compute-player-values 418 that may be executed after process load-results 414 finishes loading data related to the results of sporting contests. Process compute-player-values 418 may retrieve the information stored in results database 416. Using each team related to the performance results, process compute-player-values 418 will correlate that team information to determine the player assigned to that that team by retrieving that assignment from the assignments database 422, as shown. Process compute-player-values 418 may retrieve information from related series database 420, as shown; for example, process compute-player-values 418 may require the specified value that may be awarded to a player whenever a team assigned to that player achieves a specific performance result during a sporting contest for that league series (e.g. a regular league season). Using the assignment information, results information, and the series information, compute player values 418 will calculate the value to award to the player and store this information in values database 424, as shown. (See also FIG. 9 to FIG. 13). Values database 416 may be any suitable means or method for persistently storing information, such as, for example, a relational computer database table, a computer spreadsheet, forms, scoreboards, etc. This arrangement for obtaining the results of a sporting contest may be any suitable means for obtaining the results of the performances of the teams participating in the sporting contest.

FIG. 9 shows a chart view illustrating the values specified for win/tie/loss performances according to an embodiment. Each sporting contest may classified by a final outcome, such as, a win, a loss or a tie. In this example, a value of 1 is awarded to the player whenever a MLB team, which is assigned to the player, achieves a regular or playoff season win, as shown. Likewise, a value of 10 is awarded for an NFL game win and a value of 4 for a playoff season win, as shown. These values may be selected for the relative number of regular season MLB sporting contests compared to the number of regular season NFL sporting contests compared to the number of regular season NBA sporting contests compared to the number of regular season NHL sporting contests. In this example, no points are awarded for loss outcomes. Additionally, this chart allows for points to be awarded for NFL ties, which is 5 points per tie. The value of each result may be chosen depending on a variety of factors, including, for example, the relative popularity of each sport, the average number of sporting contests in each season compared to the average number of sporting contests in other leagues, proportionally awarding points based on the number of sporting contests within each league, regular versus playoff seasons, player interest, player preference, wagering considerations, and other factors that may contribute to providing an interesting and fun experience for the players of the game.

FIG. 10 shows a chart view illustrating the values specified for score performances according to an embodiment. Each sporting contest may be classified by the score of each team that was achieved during the sporting contest, for example, in a football game, the final score achieved may be 21 (typically, three touchdowns) to 10 (typically, a touchdown and a field goal). To determine the value to award to a player, the score of the team may be computed by multiplying the score value for the related sports league by the final score of the team. So, in the above example, the football contests winner's score of 21 would be multiplied by 20.6 (from the NFL line on the chart), thereby awarding the player assigned to this team a value of 432.6 for the team's performance during the sporting contest. Likewise, the football contests loser's score of 10 would be multiplied by 20.6 thereby awarding the player assigned to the losing team a value of 206 for the team's performance during the sporting contest. The value to assign to each point of the final score may be selected based on considering factors such as the average number of points scored by the average team over a historical time period, the relative or proportional number of points scored by a single team in different leagues, the relative popularity of the sports leagues, player interest, player preference, wagering considerations, and other factors that may contribute to providing an interesting and fun experience for the players of the game.

FIG. 11 shows a chart view illustrating the values specified for statistical performances according to an embodiment. Each sporting contest may be tracked by other types of performance statistics that may be attributed to the performance of the team as a whole, such as those shown in the chart. This method of awarding value to players allows awards based on the MLB home runs achieved by the baseball teams, the NFL touchdowns achieved by the football teams, the NBA three-pointers achieved by the basketball teams, and the NHL power play goals achieved by the hockey teams. The values in the chart were selected by estimating the number of each scoring condition, and comparing the total frequency to determine a proportional value for each league. The value to assign to each achievement of these statistical performances may be selected based on considering factors such as the average times the statistical performance occurs during the course of a season, the relative or proportional number of occurrences between different leagues, the relative popularity of the sports leagues, player interest, player preference, wagering considerations, and other factors that may contribute to providing an interesting and fun experience for the players of the game.

FIG. 12 shows a chart view illustrating the values specified for another set of statistic performances according to an embodiment. Each sporting contest may be tracked by further kinds of sporting statistics that may be attributed to the performance of the team as a whole, such as those shown in the chart. This method of awarding value to players allows awards based on the number of MLB double plays achieved during a baseball game, the number of NFL interceptions achieved during a football game, the number of steals achieved during an NBA basketball game, the number of saves achieved during an NHL hockey game. These values may be selected by comparing the average number of times that such an event may occur during a game, the total number of games, and comparing those values to other leagues, as shown. In addition, the values may be selected considering other factors, such as, for example, the relative popularity of the sports leagues, player interest, player preference, wagering considerations, and other factors that may contribute to providing an interesting and fun experience for the players of the game.

Other methods for awarding may be achieved by considering additional factors. For example, if major league, minor league and youth leagues are combined in a single game, weight may be given to sporting contests based upon the importance of league. For further example, combinations of these methods may be used in a single game. For another example, players may input the performances and the corresponding awards by which they wish to score the game. This arrangement for specifying the values to award players may be any suitable method or means for specifying the value to award to a player whenever a team assigned to the player achieves a performance during a sporting contest.

FIG. 13 shows a chart view illustrating payouts for wagers placed on the final comparison of values achieved by players of the game according to an embodiment. In embodiments that involve wagers, a payout chart may show how much to pay each player who achieves a certain awarded value. The present chart anticipates a 30 player game, after collecting $110 from each player for a total of $3300. The overall ($1^{st}$ overall) highest awarded value (compared to all other players) may be paid $1100. The $2^{nd}$ overall awarded value may be paid $500. The $3^{rd}$ overall highest awarded value may be paid $300. This embodiment further anticipates dividing players into 6 "divisions" of 5 teams; players may be selected for a division randomly, by handicapping, or other method similar to selection of draft order. Within each division, the highest awarded value may be paid $100. Finally, the wild card prized may be awarded to the highest scoring players who have not otherwise received any payment. This leaves about 10% for the "house". Paying rewards, including the types and values of awards, may be influenced by player interest, player preference, wagering considerations, and other factors that may contribute to providing an interesting and fun experience for the players of the game.

Considering FIGS. 9 to 13, in some embodiments, the selections of these various parameters may be determined by the players or by the organizer of the game. For example, these embodiments may have a setup phase where then number of teams, selection of leagues, values for wins/tie/loss, number of players, type of draft, draft order, conditions for winning, and other variables may be selected by the players or organizer of the game.

Figure 14:
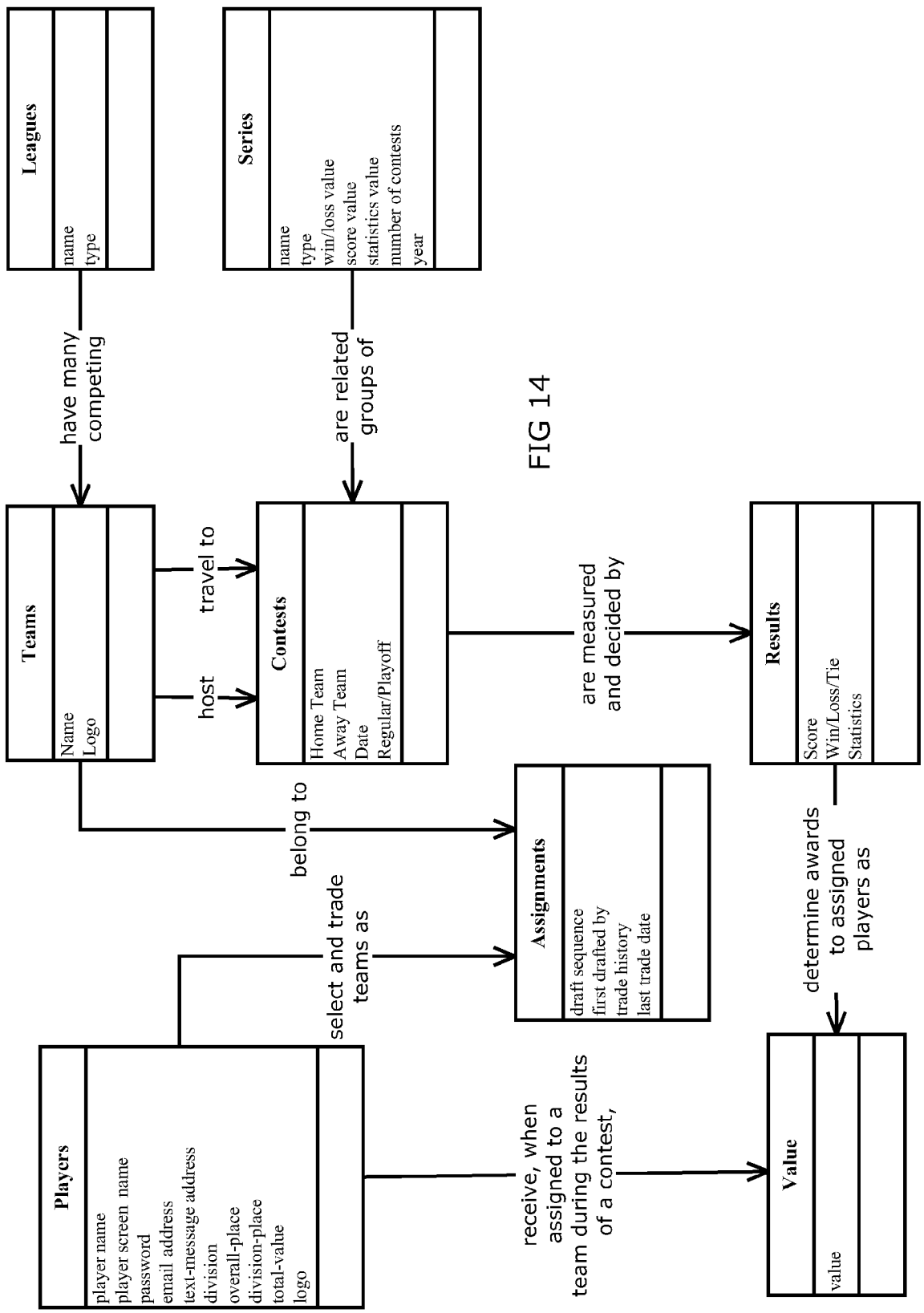
FIG. 14 shows a class diagram illustrating the relationships between players, teams, results and other example objects, including examples of attributes, according to an embodiment.

FIG. 14 shows a class diagram illustrating the relationships between players, teams, results and other example objects, including examples of attributes, according to an embodiment of the present invention. This class diagram shows the names of classes of object that may be used to develop an object oriented computer program or a relational database schema. The diagram shows attributes related to the objects. Players may have contact information, such as, for example, the player name, an email address, a text messaging address, as shown. Players may have display information, such as, for example, a player screen name and a logo. Players may have calculated information, such as, for example overall-place, division-place and total value awarded as a result of the performance of teams assigned to the player; such calculated results may be re-determined by looking to other portions of the class diagram. Players may receive, when assigned to a team when the team achieves results by performing in a sporting contest, Value, as shown. Players may also select and trade teams as Assignments, as shown.

Leagues may include attributes such as name and type (e.g. NHL, basketball, youth, etc.) Leagues may have many competing Teams.

Series may have attributes such as name, type (regular, playoff, etc.), win/loss/tie value to award, score value to award, statistic values to award, the number of sporting contests in the series, the year of the series, etc. Series are related to groups of sporting contests.

Sporting contests may contain attributes that show the home team, the away (visiting) team, the date of the contest, the type of game (regular/playoff/special/etc.) Teams may host Sporting Contests as the home team. Teams may travel to Sporting Contests as the away team. Sporting Contests are measured and decided by Results.

Results may have attributes such as final score, intermediate scores (such as the score after the end of a period, inning, quarter, etc.), the outcome classification (win/tie/loss), statistical performances of the teams, etc. Results determine awards to the player assigned to the team at the time of the sporting contest as Value. Value contains the value awarded to a Player.

Although Applicant has described Applicant's preferred embodiments of this invention, it will be understood that the broadest scope of this invention includes modifications and implementations apparent to those skilled in the art after reading the above specification and the below claims. Such scope is limited only by the below claims as read in connection with the above specification. Further, many other advantages of Applicant's invention will be apparent to those skilled in the art from the above descriptions and the below claims.

What is claimed is:

1. A multi-league sports gaming method comprising the steps of:
assembling at least one group of at least two players to play a computer game based on the results of future sporting events using a computer system, wherein the computer system is operably connected to a database and is operably connected to a display;
selecting at least two sports leagues for inclusion in the computer game, wherein the sports leagues have at least two teams of at least two athletes, wherein the teams compete within their respective sports league in at least one series of at least one sporting contest;

assigning and storing in the database at least one team from the sports leagues to at least one player of the group;

obtaining and storing in the database at least one result of the performance of the team during the sporting contest, specifying at least one value for the result and displaying the result on the display; and comparing, using the computer system, between at least two players, the values for the results of the teams assigned to the players.

2. The method of claim 1 wherein:
the number of players within the group is substantially equivalent to the average number of teams within the sports leagues.

3. The method of claim 1 wherein:
the sports leagues comprise a baseball league, a basketball team, a football league and a hockey league.

4. The method of claim 1 wherein:
the sports league consists of major leagues.

5. The method of claim 1 wherein:
the sports leagues consist of one major baseball league, one major basketball league, one major hockey league, and one major football league.

6. The method of claim 1 wherein:
the series includes at least one playoff sporting contest for at least one season.

7. The method of claim 1 wherein:
the series includes at least one regular sporting contest for at least one season.

8. The method of claim 1 wherein:
the series is selected from the group consisting of regular sporting contest, playoff sporting contest, and combinations thereof.

9. The method of claim 1 wherein:
the step of assigning comprises the step of
excluding other players from assignment to a team after assignment to a player, whereby creating an exclusive assignment of a team.

10. The method of claim 9 further comprising the step of:
allowing trading, using the computer system, between players of the exclusive assignment of a team.

11. The method of claim 9 further comprising the step of:
allowing trading, using the computer system, between players of the exclusive assignment of a team, value, and combinations thereof.

12. The method of claim 9 wherein:
the step of assigning comprises the step of
determining a draft sequence, using the computer system, to sequence the selection of the teams by the players.

13. The method of claim 1 wherein:
the step of assigning comprises the step of
allowing inputting, using the computer system, by a player in real time, of the selection of the team to indicate a preference of a team.

14. The method of claim 1 wherein:
the result comprises the final score of the sporting contest; and
the value comprises a number selected by considering the average points scored per season between sports leagues.

15. The method of claim 1 wherein:
the result comprises the outcome of the sporting contest selected from the group consisting of win, tie, and loss; and
the value comprises a number selected by considering the average number of sporting contests between sports leagues.

16. The method of claim 1 wherein:
the result comprises at least one statistic related to the performance attributable to the team; and
the value comprises a number selected by considering the average of at least one statistical performance between sports leagues.

17. The method of claim 1 wherein:
the value comprises a number selected after considering the popularity of the sports league.

18. The method of claim 1 wherein:
the value comprises a number selected by considering the major, minor, amateur, and little league status of the sports league.

19. The method of claim 1 wherein:
the result comprises at least one selected from the group consisting of at least one final score, at least one outcome, at least one statistical performance, and combinations thereof; and
the step of assigning the value comprises selecting at least one number by considering at least one factor from the group consisting of the average number of sporting contests, the score, at least one statistical performance of the team, and combinations thereof.

20. The method of claim 1 further comprising the step of:
collecting a fee from the player; and
paying a reward to at least one player after the step of comparing the values.

21. The method of claim 1 wherein:
the sports leagues consist of one major baseball league, one major basketball league, one major hockey league, and one major football league;
the series includes regular sporting contests and playoff sporting contests;
the result comprises the outcome of the sporting contest selected from the group consisting of win, tie, and loss; and
the value comprises a number selected by considering the average number of sporting contests between sports leagues.

22. The method of claim 21 wherein:
the step of assigning comprises the steps of
determining a draft sequence to sequence the selection of the teams by the players;
allowing inputting of the selection of the team by a player in real time;
excluding other players from assignment to a team after assignment to a player, whereby creating an exclusive assignment of a team.

23. A multi-league sports gaming system comprising:
at least one computer adapted to play a sports game based on the results of future sporting events, wherein the computer is operably connected to at least one database and is operably connected to at least one display;
wherein the computer is further adapted to perform the steps of
allowing assembling at least one group of at least two players;
accepting team information, wherein the team information is related to at least two sports leagues, wherein the sports leagues have at least two teams of at least two athletes, wherein the teams compete within their respective sports leagues in at least one series of at least one sporting contest;

storing assignment information in the database, wherein the assignment information is related to exclusively assigning at least one team from the sports leagues to exactly one player of the group, whereby creating an exclusive assignment of the team;

allowing importing of at least one result of the performance of the team during the sporting contest, allowing specifying at least one value for the result;

displaying on the display at least one comparison, between at least two players, the sum total of the values for the results of the teams assigned to the respective players.

24. The system of claim 23 wherein:
the computer further comprises a web server capable of transmitting a structured document and operably connected to a global network; and
the display further comprises a program capable of displaying the structured document.

25. The system of claim 24 wherein:
the structured document further comprises an email message; and
the display further comprises a email program.

26. The system of claim 24 wherein:
the structured document further comprises an text message; and
the display further comprises a phone capable of rendering a text message.

27. The system of claim 23 wherein:
the computer further comprises a web server capable of transmitting web pages transmitted by http protocol and operably connected to a global computer network; and
the display further comprises a web browser capable of rendering web pages transmitted by http protocol and operably connected to the global computer network.

28. The system of claim 27 wherein:
the computer is further adapted to perform the step of allowing transmitting of messages between players across the global computer network.

29. The system of claim 27 wherein:
the computer is further adapted to perform the steps of determining a draft sequence to sequence the selection of the teams by the players;
allowing inputting of the selection of the team by a player in real time across the global computer network;
excluding other players from assignment to a team after assignment to a player.

30. The system of claim 29 wherein:
the sports leagues consist of one major baseball league, one major basketball league, and one major football league;
the number of players within the group is substantially equivalent to the average number of teams within the sports leagues;
the series includes regular sporting contest and playoff sporting contests;
the result comprises the outcome of the sporting contest selected from the group consisting of win, tie, and loss; and
and the value comprises a number selected by considering the average number of sporting contests between sports leagues.

31. The system of claim 22 further comprising:
at least one payment server, operably connected to the computer, capable of allowing monetary transactions with the players across a global computer network.

32. The system of claim 22 further comprising:
at least one social-networking server, operably connected to the computer, capable of allowing social networking between the players.

33. A multi-league sports gaming system comprising:
assembling means to assemble at least one group of at least two players to play a game based on the results of future sporting events;
selecting means to select at least two sports leagues for inclusion in the game, wherein the sports leagues have at least two teams of at least two athletes, wherein the teams compete within their respective sports league in at least one series of at least one sporting contest;
assigning means to assign at least one team from the sports leagues to at least one player of the group;
obtaining means to obtain at least one result of the performance of the team during the sporting contest,
specifying means to specify at least one value for the result;
comparing means to compare, between at least two players, the sum total of the values for the results of the teams assigned to the respective players.

34. The system of claim 33 further comprising:
determining means to determine a draft sequence to sequence the selection of the teams by the players;
inputting means to allow inputting of the selection of the team by a player in real time; and
excluding means to exclude other players from assignment to a team after assignment to a player, whereby creating an exclusive assignment of a team.

35. The system of claim 33 wherein:
the sports leagues consist of one major baseball league, one major basketball league, and one major football league;
the number of players within the group is substantially equivalent to the average number of teams within the sports leagues;
the series includes regular sporting contest and playoff sporting contests;
the result comprises the outcome of the sporting contest selected from the group consisting of win, tie, and loss; and
and the value comprises a number selected by considering the average number of sporting contests between sports leagues.

* * * * *